United States Patent
Lee et al.

(10) Patent No.: US 10,358,290 B2
(45) Date of Patent: Jul. 23, 2019

(54) INVENTORY MANAGEMENT SYSTEM

(71) Applicant: Walmart Apollo, LLC, Bentonville, AR (US)

(72) Inventors: Ryan Lee, Bentonville, AR (US); Joseph Blackner, Bella Vista, AR (US); Santos Cerda, Jr., Bentonville, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/841,834

(22) Filed: Dec. 14, 2017

(65) Prior Publication Data

US 2018/0162640 A1 Jun. 14, 2018

Related U.S. Application Data

(60) Provisional application No. 62/434,090, filed on Dec. 14, 2016.

(51) Int. Cl.
*G06F 7/00* (2006.01)
*B65G 1/137* (2006.01)
(Continued)

(52) U.S. Cl.
CPC .......... *B65G 1/1371* (2013.01); *B65G 1/137* (2013.01); *G05D 1/00* (2013.01); *G05D 1/0094* (2013.01);
(Continued)

(58) Field of Classification Search
None
See application file for complete search history.

(56) References Cited

U.S. PATENT DOCUMENTS 7,392,948 B2 * 7/2008 Smith .................. G06Q 10/087
235/383
7,516,848 B1 4/2009 Shakes
(Continued)

FOREIGN PATENT DOCUMENTS

| CN | 105438709 | 3/2016 |
|---|---|---|
| CN | 106044032 | 10/2016 |

(Continued)

OTHER PUBLICATIONS

"Pick-To-Light System"; https://www.youtube.com/watch?v=emSHkvIgqSM; published on Jul. 12, 2010; 3 pages.
(Continued)

*Primary Examiner* — Yolanda R Cumbess
(74) *Attorney, Agent, or Firm* — Fitch, Even, Tabin & Flannery LLP

(57) ABSTRACT

In some embodiments, apparatuses and methods are provided herein useful for product storage location identification. Reconfigurable lights can be mounted to product storage locations and one or more of the lights can be illuminated to identify a particular storage location, such as for placement or pick up of a product. The system described herein can utilize radio-frequency identification (RFID) chips or tags to identify products and storage locations. So configured, the system can identify which storage location a particular product is in or can identify where a particular product should be placed.

18 Claims, 4 Drawing Sheets

(51) Int. Cl.
*G06Q 10/08* (2012.01)
*G05D 1/00* (2006.01)
*G08B 5/22* (2006.01)
*G08B 5/36* (2006.01)
*G06Q 50/28* (2012.01)

(52) U.S. Cl.
CPC ........... *G06Q 10/087* (2013.01); *G06Q 50/28* (2013.01); *G08B 5/22* (2013.01); *G08B 5/36* (2013.01); *B65G 2209/04* (2013.01); *G05D 2201/0216* (2013.01)

(56) References Cited

U.S. PATENT DOCUMENTS

| | | | | |
|---|---|---|---|---|
| 8,731,708 | B2 | 5/2014 | Shakes | |
| 8,798,784 | B1 | 8/2014 | Clark | |
| 9,171,278 | B1* | 10/2015 | Kong | G06Q 10/087 |
| 2005/0128751 | A1* | 6/2005 | Roberge | F21K 9/00 |
| | | | | 362/276 |
| 2006/0232412 | A1* | 10/2006 | Tabacman | G06K 7/10861 |
| | | | | 340/572.1 |
| 2008/0055084 | A1* | 3/2008 | Bodin | G06Q 10/08 |
| | | | | 340/572.1 |
| 2013/0317642 | A1* | 11/2013 | Asaria | G06Q 10/08 |
| | | | | 700/216 |
| 2014/0209547 | A1* | 7/2014 | Villalobos | A47B 49/00 |
| | | | | 211/36 |
| 2016/0132659 | A1* | 5/2016 | Vaz | G06F 19/3462 |
| | | | | 700/242 |

FOREIGN PATENT DOCUMENTS

| | | | |
|---|---|---|---|
| CN | 106044032 A | * | 10/2016 |
| WO | 2007119100 | | 10/2007 |

OTHER PUBLICATIONS

Lightning Pick Technologies; "Lightning Pick—Pick to Light"; https://www.youtube.com/watch?v=tP1QpKi_-Ko; published on Feb. 17, 2009; 6 pages.

Liu, G. et al.; "Resource management with RFID technology in automatic warehouse system"; Intelligent Robots and Systems, IEEE/RSJ International Conference; Oct. 9, 2006; 7 pages.

PCT; App. No. PCT/US2017/065701; International Search Report and Written Opinion dated Feb. 12, 2018.

Pick to Light Systems; "Wireless picking—Pick to Light Systems"; https://www.youtube.com/watch?v=us0uTcmf_as; published on Jul. 2, 2012; 3 pages.

SDI Systems; "Pick to Light System at Saramax"; https://www.youtube.com/watch?v=Xf0KC5S4P6M; published on Oct. 31, 2012; 6 pages.

* cited by examiner

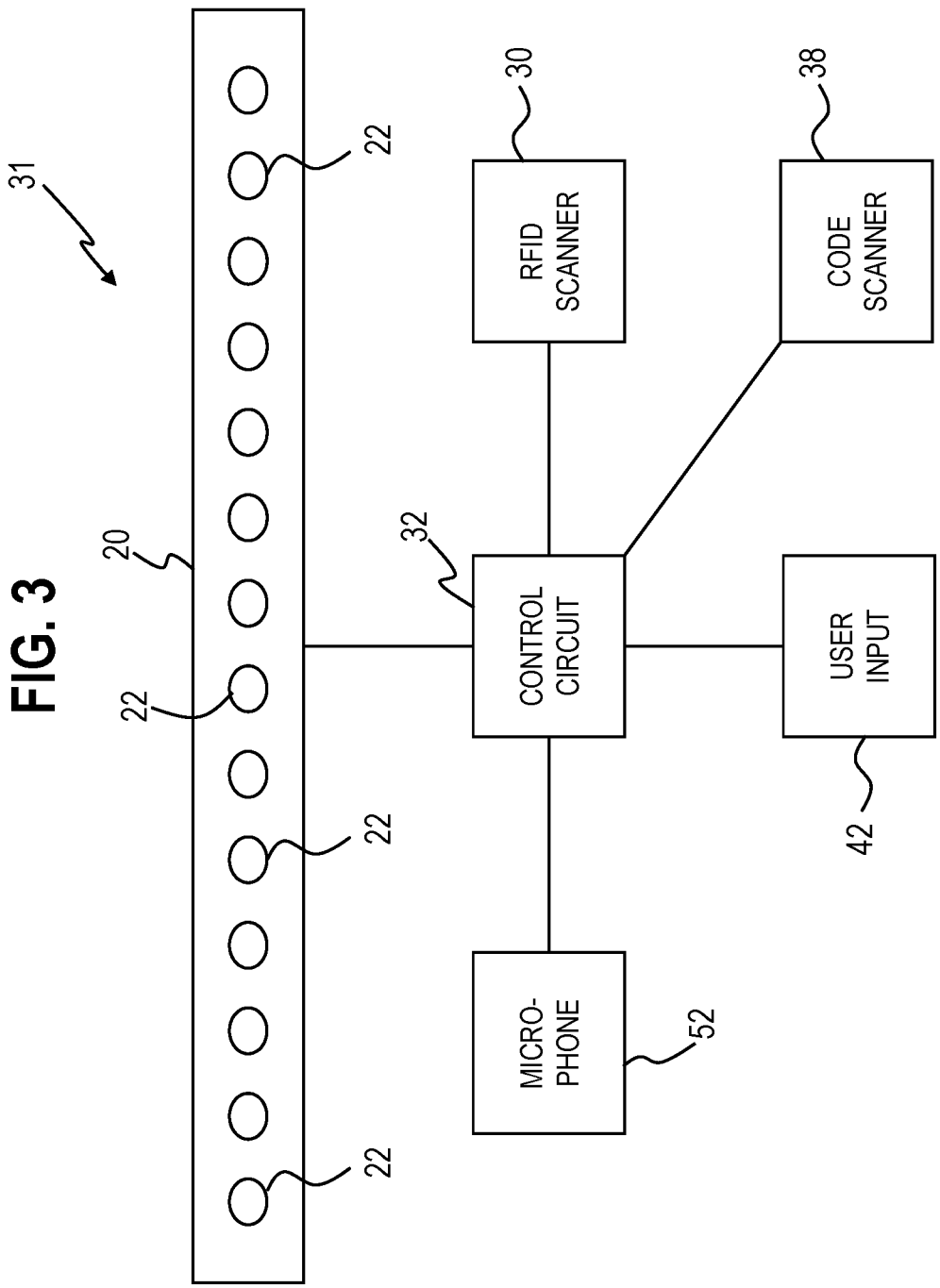

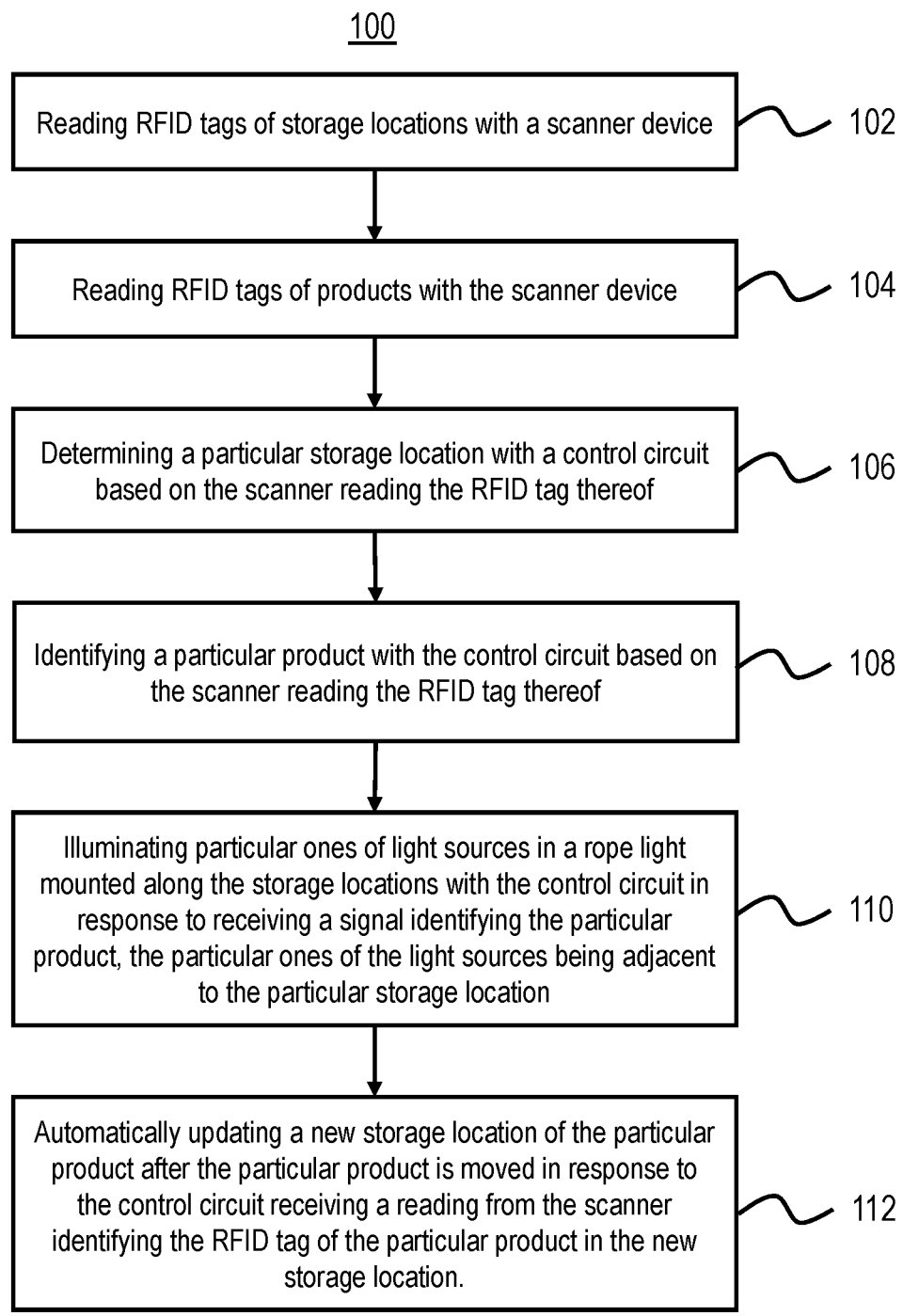

INVENTORY MANAGEMENT SYSTEM

CROSS-REFERENCE TO RELATED APPLICATION

This application claims the benefit of U.S. Provisional Application No. 62/434,090, filed Dec. 14, 2016, which is incorporated herein by reference in its entirety.

TECHNICAL FIELD

This invention relates generally to tracking packages and, more particularly, to managing inventory.

BACKGROUND

Accurate and efficient product flow is important for any retail location. Retail locations can receive new products from various transportation options and store the products in the retail location prior to stocking and display at the front of the store. When an associate receives a task to restock a product, the association first finds the product and then transports the product to the product's location at the front of the store. Time can be lost both in processing of products received at the retail location and in associates looking for particular products when trying to fulfill restocking tasks.

BRIEF DESCRIPTION OF THE DRAWINGS

Disclosed herein are embodiments of systems, apparatuses and methods pertaining to product storage location identification and product tracking. This description includes drawings, wherein:

FIG. 3 is a diagrammatic view of a light indication assembly in accordance with some embodiments.

FIG. 4 is a flowchart in accordance with several embodiments.

Figure 1:
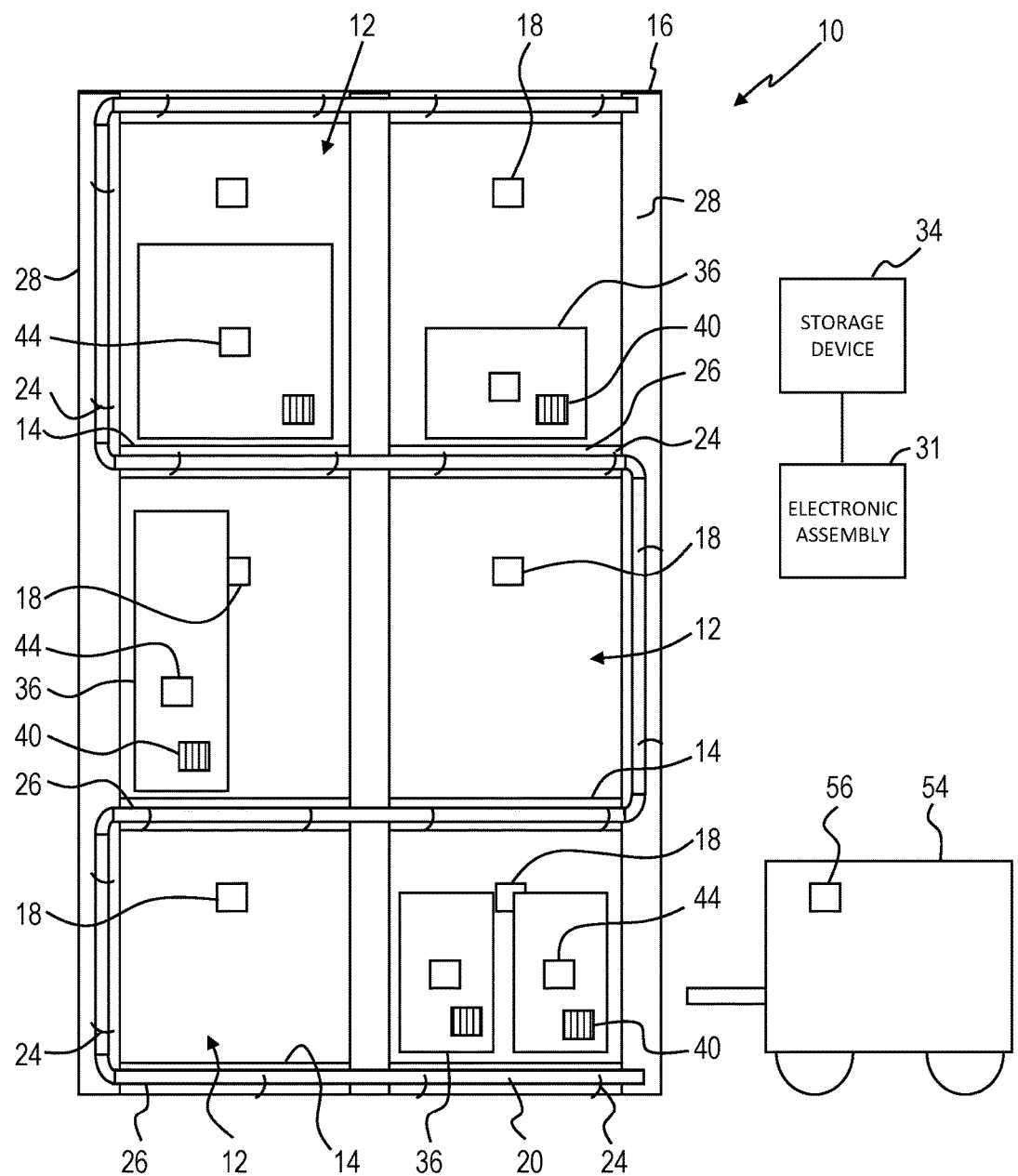
FIG. 1 is a front elevational view of a shelving unit having storage locations for packages therein and a light indication assembly mounted thereto in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for fast and easy product storage location identification. Reconfigurable lights can be mounted to product storage locations and one or more of the lights can be illuminated to identify a particular storage location, such as for placement or pick up of a product. The system described herein can utilize radio-frequency identification (RFID) chips or tags to identify products and storage locations. So configured, the system can identify which storage location a particular product is in or can identify where a particular product should be placed.

An inventory system 10 is shown in FIGS. 1-4. In a first form shown in FIG. 1, storage locations 12 can be portions of shelves 14 in one or more shelving units 16. The shelving unit 16 shown in FIG. 1 can be permanently installed or portable as desired. Each storage location 12 has an associated RFID tag 18, which can be passive or active. The RFID tags 18 of the storage locations 12 conveniently identify the storage locations 12 to the system 10.

To provide a visual indication to users of the system 10, a rope light 20 is mounted or secured to the shelving unit 16 to be visible thereon. The rope light 20 includes a plurality of spaced light sources 22 disposed along the length thereof. In one form, the light sources 22 are light emitting diodes disposed within the rope light 20. As such, the light sources 22 are protected against damage from items hitting the rope light 20.

As shown in FIG. 1, the shelving unit 16 can include fasteners 24 mounted or secured along front surfaces 26 thereof, such as the front surfaces 26 of the shelves 14. The fasteners 24 can be hooks, hook-and-loop, adhesive, and so forth. As such, a user can easily mount and reconfigure the rope light 20 to the shelving unit 16 so that the rope light 20 can be used to identify desired areas.

In one form, the rope light 20 can have a length sufficient to extend along the front surfaces 26 of each of the shelves 14. If desired, the rope light 20 can be divided into portions that can connect together so that the rope light 20 can be operated by a single source. In the illustrated form, the rope light 20 has a winding configuration, beginning at a corner storage location 12 of the shelving unit 16, such as a lower corner thereof, extending across the shelf 14, extending upwardly along a side 28 of the shelving unit 16, extending across the next shelf 14 up, and so forth.

As shown in FIG. 3, the system 10 includes an electronic assembly 31 including an RFID scanner 30, which can be disposed adjacent to the shelving unit 16 so that the RFID scanner 30 can read the RFID tags 18 of each of the storage locations 12 to thereby identify the storage locations 12 to the system 10. More specifically, the RFID scanner 30 is connected to a control circuit 32 that is configured to receive the readings therefrom. The control circuit 32 then associates each RFID tag 18 with the associated storage location 12 thereof. Alternatively, for larger or spaced configurations, multiple RFID scanners 30 can be utilized.

As shown in FIG. 1, the control circuit 32 of the electronic assembly 31 can also access a storage device 34, such as a server or database device to retrieve product location information. In one form, the product location information can contain an assigned storage location 12 for products 36. As such, the control circuit 32, upon receiving identification of a particular product 36 can determine which storage location 12 is assigned for that product 36.

By some approaches, the system 10 can include a scanner or reader 38 for identification of the particular product 36 when a barcode or other machine readable code 40 is presented thereto. In alternative or additional approaches, the user can enter product identification information, such as an identification code, SKU, product name, or the like, using a user input 42, such as a keyboard, number pad, touch screen, mouse, or the like. In yet further approaches, the product 36 can include an RFID tag 44 for identification. In these approaches, the RFID scanner 30 can read the RIFD tags 44 of products within a range thereof. If desired, the user can identify the particular product 36 being stored among a plurality of scanned products 36 by using the user input 42.

The control circuit 32 can further be operably coupled to the rope light 20 so that the control circuit 32 can selectively illuminate one or more of the light sources 22 thereof. The control circuit 32 can be hard wired to the rope light 20 or can communicate therewith using any suitable communication method, such as radio, WiFi, infrared, near field communication, Bluetooth, or the like. The rope light 20 can further include suitable circuitry and components, such as a receiver, to illuminate the light source(s) 22 instructed by the control circuit 32 and can be connected to a common power source as the control circuit 32 or can be independently hard-wired or battery-powered.

Further, the control circuit 32 can be configured to associate individual ones of the light sources 22 or groups of the light sources 22 with storage locations 12 that are adjacent thereto. For example, as shown in FIG. 1, a given shelf 14 may have two storage locations 12 thereon for one or more products 36. The rope light 20 extends along the front 26 of the shelf 14, such that the light sources 22 therein are disposed adjacent to one of the storage locations 12. By one approach, a user can identify the light sources 22 to be associated with each storage location 12 to the control circuit 32, such as by using the user input 42. By another approach, the control circuit 32 can identify distances to the various storage locations 12 using the RIFD tags 18 thereof and associate the adjacent light sources 22 therewith based on known rope light configurations. With these components, the system 10 can be easily updated for different products 36 and differently sized storage locations 12. For example, if a new product 36 is assigned to a shelf 14 and the product 36 takes up more space than the previous product 36, the control circuit 32 can be configured to add light sources 22 to the storage location 12. Additionally, the rope light 20 can be moved and repositioned across the shelving units 16, or other storage locations 12, as desired and input to the control circuit 32.

So configured, a user tasked with storing a product 36 can identify the product 36 to the control circuit 32 using any suitable method, such as the methods described herein. In response to receiving the identification, the control circuit 32 can access the product location information on the storage device 34 to identify the storage location 12 assigned to the product 36 and can determine which light sources 22 are disposed adjacent to the storage location 12. Thereafter, the control circuit 32 can then illuminate the light sources 22 to provide a visual indication to the user where the product 36 should be placed. By one approach, the control circuit 32 can be configured to automatically illuminate light sources 22 for a storage location 12 upon receiving a reading of a product RFID tag 44 from the RFID scanner 30. As such, the system 10 can be utilized to quickly and easily identify a given storage location 12 for a particular product 36 and a user can place the product 36 in the identified storage location 12.

The system 10 can further be used to identify a product or products 36 for pick up and transport to other locations. For example, a user tasked with moving a product 36 can identify the product 36 to the control circuit 32 using any suitable method, such as the methods described herein. In response to receiving the identification, by one approach, the control circuit 32 can access the product location information on the storage device 34 to identify the storage location 12 assigned to the product 36 and can determine which light sources 22 are disposed adjacent to the storage location 12. By another approach, the control circuit 32 can determine where the product 36 is located based on the RFID readings of the RIFD tags 18, 44 from the scanner 30. Thereafter, the control circuit 32 can then illuminate the light sources 22 adjacent to the storage location 12 to indicate to the user the storage location 12 that the product 36 is stocked in. If desired, the control circuit 32 can keep the light sources 22 energized until the user takes the product 36 out of range of the scanner 30.

Figure 2:
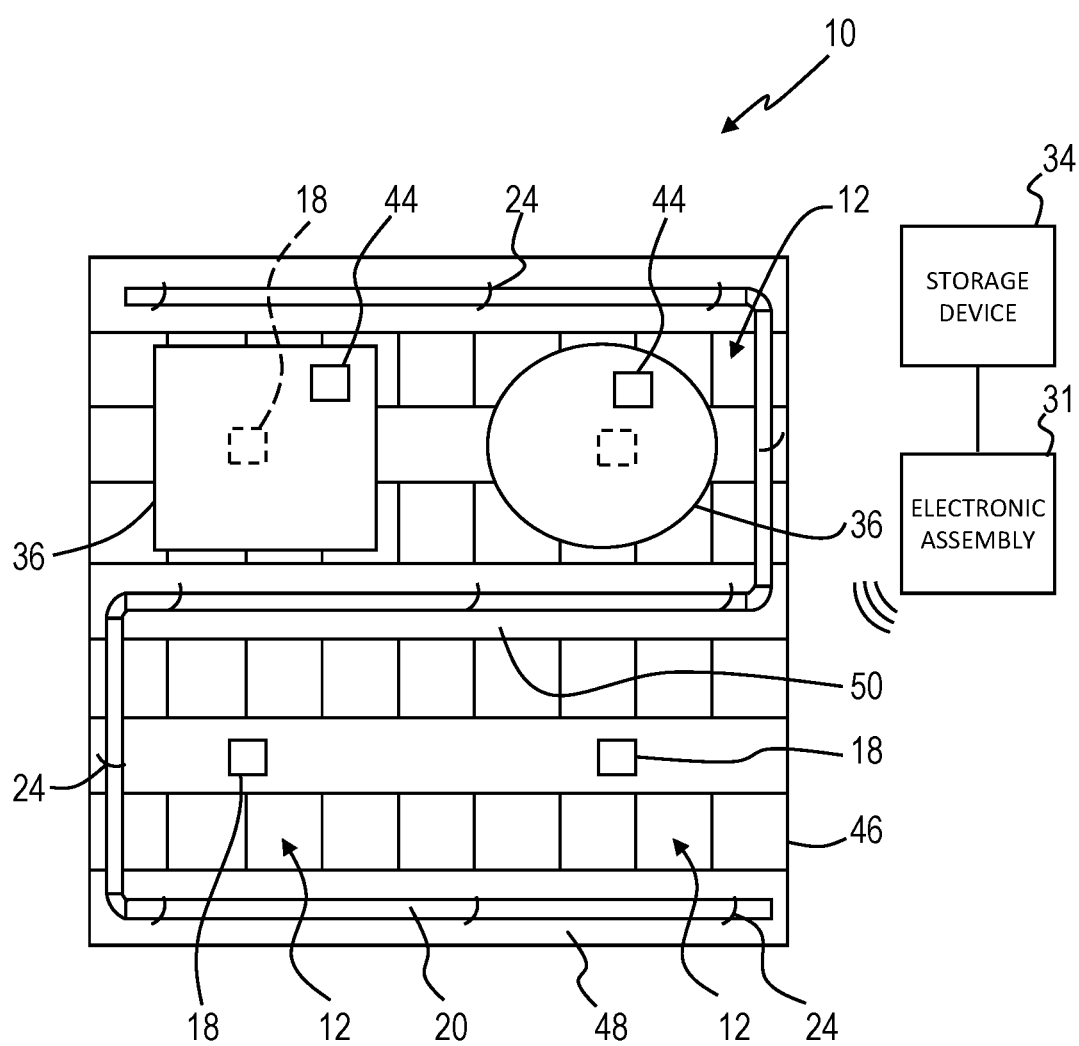
FIG. 2 is a top plan view of a pallet having storage locations for packages thereon and a light indication assembly mounted thereto in accordance with several embodiments.

In another form, as shown in FIG. 2, the storage locations 12 can be portions of a pallet 46 or other movable structure, such as a cart. In these forms, the rope light 20 can be mounted to the pallet 46 to indicate the storage locations 12 thereon, such as around a perimeter 48 thereof and/or extending across an interior 50 thereof dividing the pallet 46 into sections. Similar to the above embodiments, the control circuit 32 can be in communication with the rope light 20 mounted to the pallet 46 and can be configured to illuminate light sources 22 within the rope light 20 to provide a visual indication of desired or intended storage locations 12 on the pallet 46.

The control circuit 32 can also access or receive shipping information for products 36. The shipping information can include the order that products 36 are stocked on delivery vehicles or other shipping containers, such that the control circuit 32 can determine the order in which products 36 are taken out of the vehicle. As such, the control circuit 32 can then illuminate light sources 22 adjacent to the storage location 12 on the pallet 46 for the products 36. Similarly, the control circuit 32 can identify the storage location 12 for desired products 36 on the pallet 46 pick-up after receiving an identification thereof as set forth above.

As shown in FIG. 3, the system 10 can further include one or more microphones 52 in communication with the control circuit 32 and the control circuit 32 can be configured to respond to voice commands spoken into the microphones 52. The microphones 52 can be mounted adjacent to the storage locations 12 and/or can be worn by users and be configured to wirelessly communicate with the control circuit 32 as desired. One example voice command input can be identification of the product 36 for pick-up or placement. Another example voice command input can be a command to turn light sources 22 on or off.

If desired, as shown in FIG. 1, the system 10 can include an autonomous vehicle or robot 54, configured as commonly understood, to perform work flow tasks, such as product pick-up, transport, and delivery. The vehicle 54 can be an aerial or ground-based unit as desired. For example, the vehicle 54 can be directed to pick up a product 36 from a storage location 12 and/or place a product 36 in a storage location 12. The control circuit 32 illuminating the lights for the storage location 12 can aid users in determining whether the vehicle is operating correctly and performing the correct task. Further, the vehicle 54 can operate in response to voice commands, either through the microphone 52 or directly to a microphone 56 of the vehicle.

So configured, the system 10 can be utilized to automatically track movement of products 36. Using the product RFID tags 44, the storage location RFID tags 18, and the product location information stored on the storage device 34, the system 10 can both determine intended storage locations 12 for the products 36, as well as current storage locations 12 for the products 36. Moreover, the current storage locations 12 can be easily updated when the products 36 are moved. This advantageously saves time over systems where product locations have to be manually entered and updated.

In some embodiments, a product tracking system is described herein that includes storage locations for products that each have associated RFID tags; a rope light having light sources spaced along a length thereof that is mounted along the storage locations; products that have associated RFID tags; a scanner disposed adjacent to the storage locations and that is configured to scan the RFID tags of the storage locations and the products; and a control circuit in communication with the scanner. The control circuit is configured to determine a particular storage location and identification of a particular product based on the scanner reading the RFID tags thereof and is further configured to illuminate particular ones of the light sources in the rope light adjacent to the particular storage location in response to receiving a signal identifying the particular product.

By several approaches, the control circuit can be configured to illuminate the particular ones of the light sources in the rope light to identify the particular storage location for placement of the particular product.

By some approaches, the control circuit can be configured to illuminate the particular ones of the light sources in the rope light to identify the particular storage location for retrieval of the particular product from the particular storage location.

By several approaches, the rope light can be reconfigurable for differently sized products. By further approaches, the rope light can be mounted to front surfaces of the storage locations using fasteners.

By some approaches, the control circuit can be configured to automatically update a storage location of the particular product after the particular product is moved to a new storage location and scanned by the scanner.

In several embodiments and as shown in FIG. 4, a method 100 for determining the location of a product is described herein that includes reading 102 RFID tags of storage locations with a scanner device; reading 104 RFID tags of products with the scanner device; determining 106 a particular storage location with a control circuit based on the scanner reading the RFID tag thereof; identifying 108 a particular product with the control circuit based on the scanner reading the RFID tag thereof; and illuminating 110 particular ones of light sources in a rope light mounted along the storage locations with the control circuit in response to receiving a signal identifying the particular product, the particular ones of the light sources being adjacent to the particular storage location.

By some approaches, illuminating the particular ones of the light sources in the rope light comprises illuminating the particular ones of the light sources in the rope light to identify the particular storage location for placement of the particular product.

By several approaches, illuminating the particular ones of the light sources in the rope light comprises illuminating the particular ones of the light sources in the rope light to identify the particular storage location for retrieval of the particular product from the particular storage location.

By some approaches, the method can further include reconfiguring the rope light along the storage locations for differently sized products. By further approaches, the method can include removably mounting the rope light to front surfaces of the storage locations using fasteners.

By several approaches, the method 100 further includes automatically updating 112 a new storage location of the particular product after the particular product is moved in response to the control circuit receiving a reading from the scanner identifying the RFID tag of the particular product in the new storage location.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A product tracking system comprising:
   storage locations for products, the storage locations each having associated RFID tags;
   a rope light having a winding configuration and extending across the storage locations, the rope light having a plurality of light sources disposed within an interior of the rope light and positioned in a spaced relationship to one another along a length of the rope light, the rope light being mounted to a surface of the storage locations, the rope light being reconfigurable for differently sized products;
   products having associated RFID tags;
   a scanner disposed adjacent to the storage locations and configured to scan the RFID tags of the storage locations and the products;
   a control circuit in communication with the scanner and configured to determine a particular storage location and identification of a particular product based on the scanner reading the RFID tags thereof, the control circuit further configured to illuminate particular ones of the light sources in the rope light adjacent to the particular storage location in response to receiving a signal identifying the particular product.

2. The product tracking system of claim 1, wherein the control circuit is configured to illuminate the particular ones of the light sources in the rope light to identify the particular storage location for placement of the particular product.

3. The product tracking system of claim 1, wherein the control circuit is configured to illuminate the particular ones of the light sources in the rope light to identify the particular storage location for retrieval of the particular product from the particular storage location.

4. The product tracking system of claim 1, wherein the storage locations comprise shelves of a shelving unit.

5. The product tracking system of claim 1, wherein the storage locations comprise portions of a pallet.

6. The product tracking system of claim 1, wherein the rope light is mounted to front surfaces of the storage locations using fasteners.

7. The product tracking system of claim 1, wherein the control circuit is configured to automatically update a storage location of the particular product after the particular product is moved to a new storage location and scanned by the scanner.

8. The product tracking system of claim 1, further comprising an autonomous robot configured to receive commands to retrieve the particular product from the particular storage location or place the particular product in the particular storage location.

9. The product tracking system of claim 1, wherein the control circuit is further configured to operate in response to verbal commands.

10. A method for determining the location of a product, the method comprising:

reading RFID tags of storage locations with a scanner device;

reading RFID tags of products with the scanner device;

determining a particular storage location with a control circuit based on the scanner reading the RFID tag thereof;

identifying a particular product with the control circuit based on the scanner reading the RFID tag thereof;

illuminating particular ones of light sources in a rope light having a winding configuration and extending across the storage locations, the rope light having the light sources disposed within an interior of the rope light and positioned in a spaced relationship to one another along a length of the rope light, the rope light being mounted to a surface of the storage locations with the control circuit in response to receiving a signal identifying the particular product, the particular ones of the light sources being mounted adjacent to the particular storage location; and reconfiguring the rope light along the storage locations for differently sized products.

11. The method of claim 10, wherein illuminating the particular ones of the light sources in the rope light comprises illuminating the particular ones of the light sources in the rope light to identify the particular storage location for placement of the particular product.

12. The method of claim 10, wherein illuminating the particular ones of the light sources in the rope light comprises illuminating the particular ones of the light sources in the rope light to identify the particular storage location for retrieval of the particular product from the particular storage location.

13. The method of claim 10, wherein the storage locations comprise shelves of a shelving unit.

14. The method of claim 10, wherein the storage locations comprise portions of a pallet.

15. The method of claim 10, further comprising removably mounting the rope light to front surfaces of the storage locations using fasteners.

16. The method of claim 10, further comprising automatically updating a new storage location of the particular product after the particular product is moved in response to the control circuit receiving a reading from the scanner identifying the RFID tag of the particular product in the new storage location.

17. The method of claim 10, further comprising commanding an autonomous robot to retrieve the particular product from the particular storage location or place the particular product in the particular storage location.

18. The method of claim 10, further comprising controlling operation of the control circuit with verbal commands.

* * * * *